(12) United States Patent
Huang et al.

(10) Patent No.: US 12,706,720 B2
(45) Date of Patent: Aug. 11, 2026

(54) TECHNIQUES FOR REPORTING COHERENCE TYPE OR REFERENCE SIGNAL TYPE IN WIRELESS COMMUNICATIONS

(71) Applicant: QUALCOMM Incorporated, San Diego, CA (US)

(72) Inventors: Yi Huang, San Diego, CA (US); Timo Ville Vintola, San Diego, CA (US); Peter Gaal, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 400 days.

(21) Appl. No.: 18/421,668

(22) Filed: Jan. 24, 2024

(65) Prior Publication Data

US 2025/0240143 A1 Jul. 24, 2025

(51) Int. Cl.
*H04L 5/00* (2006.01)
*H04B 7/0417* (2017.01)
*H04B 7/06* (2006.01)

(52) U.S. Cl.
CPC ......... *H04L 5/0053* (2013.01); *H04B 7/0417* (2013.01); *H04L 5/0048* (2013.01); *H04B 7/0628* (2013.01)

(58) Field of Classification Search
CPC ... H04L 5/0053; H04L 5/0048; H04B 7/0417; H04B 7/0628; H04B 7/0456
See application file for complete search history.

(56) References Cited

U.S. PATENT DOCUMENTS

2024/0056341 A1* 2/2024 Sun ......................... H04W 8/24
2024/0244606 A1* 7/2024 Zhang .................. H04B 7/0478
2025/0062800 A1* 2/2025 Lee ...................... H04B 7/0639

* cited by examiner

*Primary Examiner* — Fred A Casca
(74) *Attorney, Agent, or Firm* — ArentF ox Schiff, LLP

(57) ABSTRACT

Aspects described herein relate to transmitting, to a network node, user equipment (UE) capability information including one or more values that independently indicate, for a first reference signal (RS) type, a first codebook supporting a first level of coherency among multiple antennas, and, for a second RS type, a second codebook supporting a second level of coherency among the multiple antennas, and receiving, from the network node, an indication of which of the first codebook or the second codebook, or which of the first RS type or the second RS type, to use in transmitting RS to the network node. Other aspects relate to receiving the UE capability information, and transmitting the indication of which codebook to use.

30 Claims, 7 Drawing Sheets

Receive UE capability information including one or more values that independently indicate, for a first RS type, a first codebook supporting a first level of coherency among multiple antennas, and, for a second RS type, a second codebook supporting a second level of coherency among the multiple antennas (602)

Transmit an indication of which of the first codebook or the second codebook, or which of the first RS type or the second RS type, to use in transmitting the RS (604)

Receive, according to the indication, the RS based on one of the first RS type and using the first codebook or the second RS type and using the second codebook (606)

Receive, according to the indication, an uplink shared channel transmission based on one of the first codebook or the second codebook (608)

TECHNIQUES FOR REPORTING COHERENCE TYPE OR REFERENCE SIGNAL TYPE IN WIRELESS COMMUNICATIONS

FIELD OF THE DISCLOSURE

Aspects of the present disclosure relate generally to wireless communication systems, and more particularly, to coherence type or reference signal type to use in wireless communications.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to transmit, for a network node, capability information including one or more values that independently indicate, for a first reference signal (RS) type, a first codebook supporting a first level of coherency among multiple antennas, and, for a second RS type, a second codebook supporting a second level of coherency among the multiple antennas, receive, from the network node, an indication of which of the first codebook or the second codebook, or which of the first RS type or the second RS type, to use in transmitting RS to the network node, and transmit, for the network node and according to the indication, the RS based on one of the first RS type and using the first codebook or the second RS type and using the second codebook.

In another aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to receive, for a user equipment (UE), UE capability information including one or more values that independently indicate, for a first RS type, a first codebook supporting a first level of coherency among multiple antennas, and, for a second RS type, a second codebook supporting a second level of coherency among the multiple antennas, transmit, for the UE, an indication of which of the first codebook or the second codebook, or which of the first RS type or the second RS type, to use in transmitting RS to the apparatus, and receive, for the UE and according to the indication, the RS based on one of the first RS type and using the first codebook or the second RS type and using the second codebook.

In another aspect, a method for wireless communication at a UE is provided that includes transmitting, for a network node, UE capability information including one or more values that independently indicate, for a first RS type, a first codebook supporting a first level of coherency among multiple antennas, and, for a second RS type, a second codebook supporting a second level of coherency among the multiple antennas, receiving, from the network node, an indication of which of the first codebook or the second codebook, or which of the first RS type or the second RS type, to use in transmitting RS to the network node, and transmitting, for the network node and according to the indication, the RS based on one of the first RS type and using the first codebook or the second RS type and using the second codebook.

In another aspect, a method for wireless communication at a network node is provided that includes receiving, for a UE, UE capability information including one or more values that independently indicate, for a first RS type, a first codebook supporting a first level of coherency among multiple antennas, and, for a second RS type, a second codebook supporting a second level of coherency among the multiple antennas, transmitting, for the UE, an indication of which of the first codebook or the second codebook, or which of the first RS type or the second RS type, to use in transmitting RS to the network node, and receiving, for the UE and according to the indication, the RS based on one of the first RS type and using the first codebook or the second RS type and using the second codebook.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
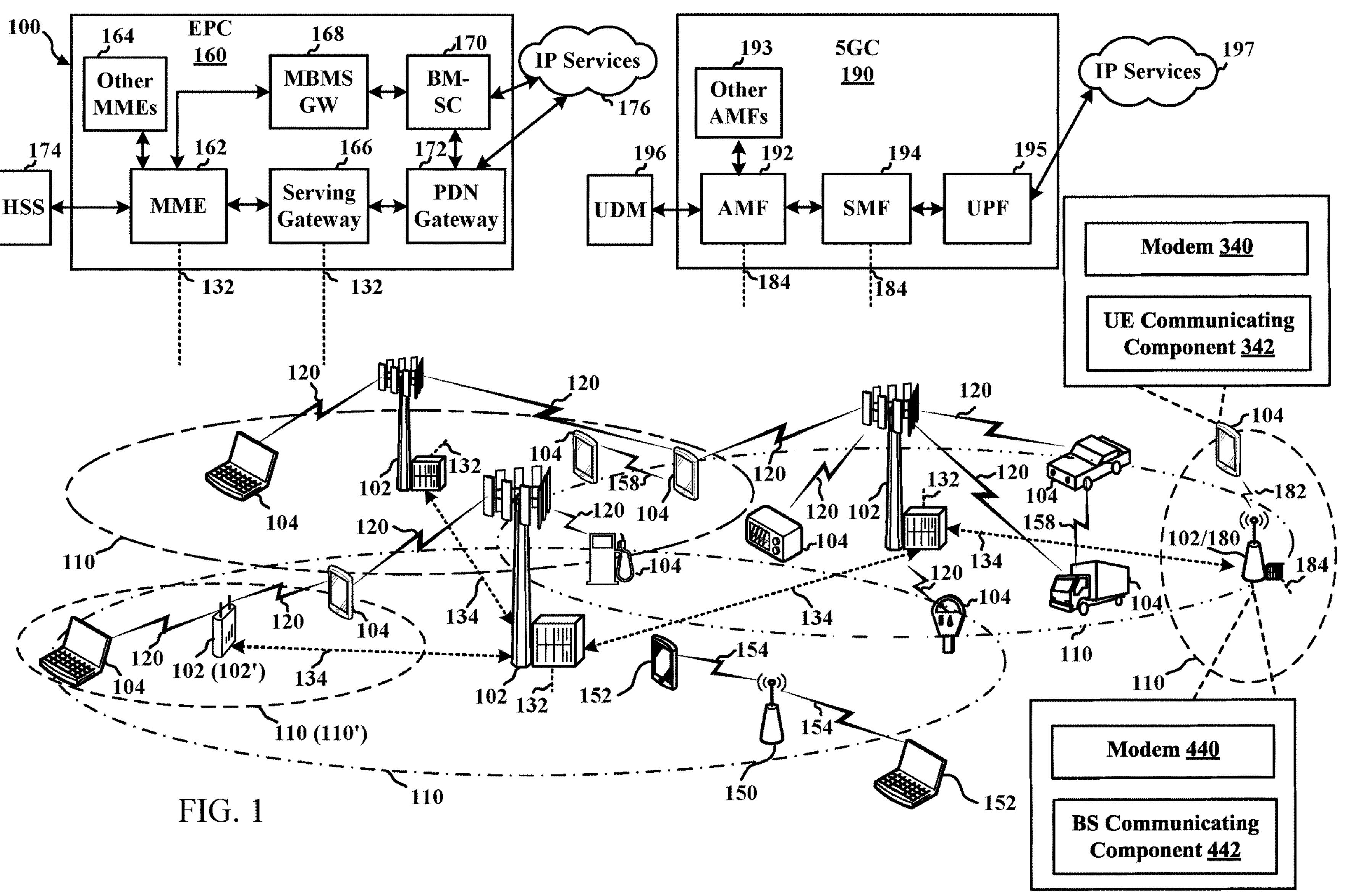
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to reporting coherence type or reference signal type that is supported, or to use, for wireless communications. For example, a device, such as a user equipment (UE) in fifth generation (5G) new radio (NR) or other wireless communication technologies, can have multiple antennas over which the device can transmit signals in a wireless network (e.g., to a network node, such as a gNB). The device may be capable of achieving coherency over some combination(s) of the multiple antennas. For example, the device may be capable of achieving coherency over all antennas (full coherent), over partial combinations of the antennas (partial coherent) or over none of the antennas (noncoherent). Coherency (or antennas being coherent) can refer to the ability of the device to guarantee (or at least represent) coherence in phase for signals transmitted over the antennas or ports indicated as coherent. Coherence in phase can allow an entity scheduling the device transmission (e.g., a gNB or other network node) to request (e.g., via a codebook) that the device transmit signals from the antennas or ports with a specific phase or phase difference among the antennas or ports.

To achieve coherence among antennas or ports, e.g., during manufacturing or other process performed before the device is used for wireless communications in a wireless network, the power amplifiers associated with the antennas or ports can be jointly calibrated to be able to achieve the phase difference. Depending on the type or class of device, however, different levels of coherency among antennas may be possible. For example, in a device where antennas are located around a device housing, the device may not have power amplifiers that are jointly calibrated at all locations around the device housing, and thus the device may not be able to guarantee phase coherence among these antennas. The antennas, however, may be in groups of two, and the device may be able to guarantee (or at least represent) phase coherency among antennas in a given group.

In a specific example, a UE in 5G NR can have eight antenna ports, and 5G NR defines multiple types or levels of coherence for transmitting physical uplink shared channel (PUSCH) transmissions. In an example, the multiple types or levels of coherence can be associated with different codebooks or codebook types. The levels of coherence defined in 5G NR include (1) full coherent where coherency is supported for all eight antenna ports in transmitting PUSCH transmissions (which can correspond to a first codebook type, e.g., codebook1), (2) partial coherent 4+4 where coherency is supported for a first group of four antenna ports and coherency is supported for a second group of four antenna ports, but coherency is not supported between the first group and the second group (which can correspond to a second codebook type, e.g., codebook2), (3) partial coherent 2+2+2+2 where coherency is supported for a first group of two antenna ports and coherency is supported for a second group of two antenna ports and coherency is supported for a third group of two antenna ports and coherency is supported for a fourth group of two antenna ports, but coherency is not supported between any of the first group, the second group, the third group, or the fourth group (which can correspond to a third codebook type, e.g., codebook3), and (4) noncoherent where coherency is not supported among any of the eight antenna ports (which can correspond to a fourth codebook type, e.g., codebook4). The terms “coherence type” and “level of coherency” are used interchangeably throughout this description. The type or level of coherency may, in some examples, refer to the number of antennas over which coherency can be guaranteed or configured by the UE. In addition, the above examples are specific examples of some different types/levels of coherency, and in other examples there may be additional/different types/levels of coherency supported for the UE and for which the UE can similarly indicate capability for supporting.

In another example, in 5G NR, a UE can support two types of sounding reference signal (SRS) transmitted for the eight antenna ports, including (1) time division multiplexed (TDMed) SRS, and (2) non-TDMed (noTDMed) SRS. In TDM SRS, the UE can transmit SRS for multiple antenna ports in two (or more) orthogonal frequency division multiplexing (OFDM) symbols, such that one OFDM symbol includes SRS for a first portion of the multiple antenna ports (e.g., the first four antenna ports), and at least a second OFDM symbol include SRS for a second portion of the multiple antenna ports (e.g., the second four antenna ports). In noTDMed SRS, the UE can transmit SRS for the multiple antenna ports in a single OFDM symbol. It may be more complex, and require more complex or expensive hardware to guarantee phase coherency when transmitting SRS in different OFDM symbols (e.g., for TDMed SRS).

In 5G NR, a UE can transmit UE capability signaling to separately report its capability regarding coherency and SRS transmission type. For example, the UE capability signaling can include SRS 8 transmit (Tx) ports—codebook, which can be the UE capability signaling of 8 Tx SRS for codebook based PUSCH. The component values for this capability signaling can be {noTDMed SRS, noTDMed and TDMed SRS}. The UE capability signaling can separately include (1) support of codebook-based 8 Tx PUSCH—codebook1, which can be the UE capability signaling to indicate supporting full coherent 8 Tx PUSCH, (2) support of codebook-based 8 Tx PUSCH-codebook2, which can be the UE capability signaling to indicate supporting partial coherent 8 Tx PUSCH with two antenna groups (4+4 structure), (3) support of codebook-based 8 Tx PUSCH-codebook3, which can be the UE capability signaling to indicate supporting partial coherent 8 Tx PUSCH with 4 antenna groups (2+2+2+2 structure), and (4) support of codebook-based 8 Tx PUSCH-codebook4, which can be the UE capability signaling to indicate supporting non coherent 8 Tx PUSCH.

Using this UE capability signaling, the UE is limited to reporting one type of coherency for both "noTDMed SRS" and "noTDMed and TDMed SRS." As explained above, however, achieving TDMed SRS may be more difficult, and thus a UE may be able to guarantee (or at least represent) a first phase coherency for noTDMed SRS and a second (less coherent) phase coherency for TDMed SRS. Using conventional defined UE capability signaling, however, the UE is not able to indicate capability to support different phase coherency for "noTDMed SRS" and "noTDMed and TDMed SRS."

Aspects described herein relate to enabling the UE to indicate capability (e.g., transmit UE capability signaling) for supporting different phase coherency for different types of reference signal (RS) transmissions (e.g., different phase coherency for "noTDMed SRS" and "noTDMed and TDMed SRS"). A node scheduling the UE for transmitting uplink (or sidelink) communications can receive the UE capability signaling and can accordingly schedule the UE to transmit the uplink (or sidelink) communications including indicating a phase difference among antenna ports for which the UE supports coherency and/or an RS configuration for which the UE supports the coherency. This can allow the UE to indicate and support different types of coherency depending on whether the transmissions are associated with "noTDMed SRS" or "noTDMed and TDMed SRS," which can allow for using maximum coherency when possible.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for jointly indicating capability for coherence type and RS type for uplink transmissions, in accordance with aspects described herein. In addition, some nodes may have a modem 440 and BS communicating component 442 for scheduling UE transmissions based on a jointly-indicated capability for coherence type and RS type for uplink transmissions, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (NB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 of a UE 104 can transmit UE capability signaling jointly indicating support for a coherence type and a RS type, which can allow the UE 104 to indicate support for a different coherence types for a given RS type. A BS communicating component 442 of a base station 102 or gNB 180 can receive the UE capability signaling and accordingly schedule the UE 104 to transmit uplink communications (e.g., a SRS, PUSCH, etc.) using a coherence type supported for a given RS type requested by the BS communicating component 442.

Figure 2:
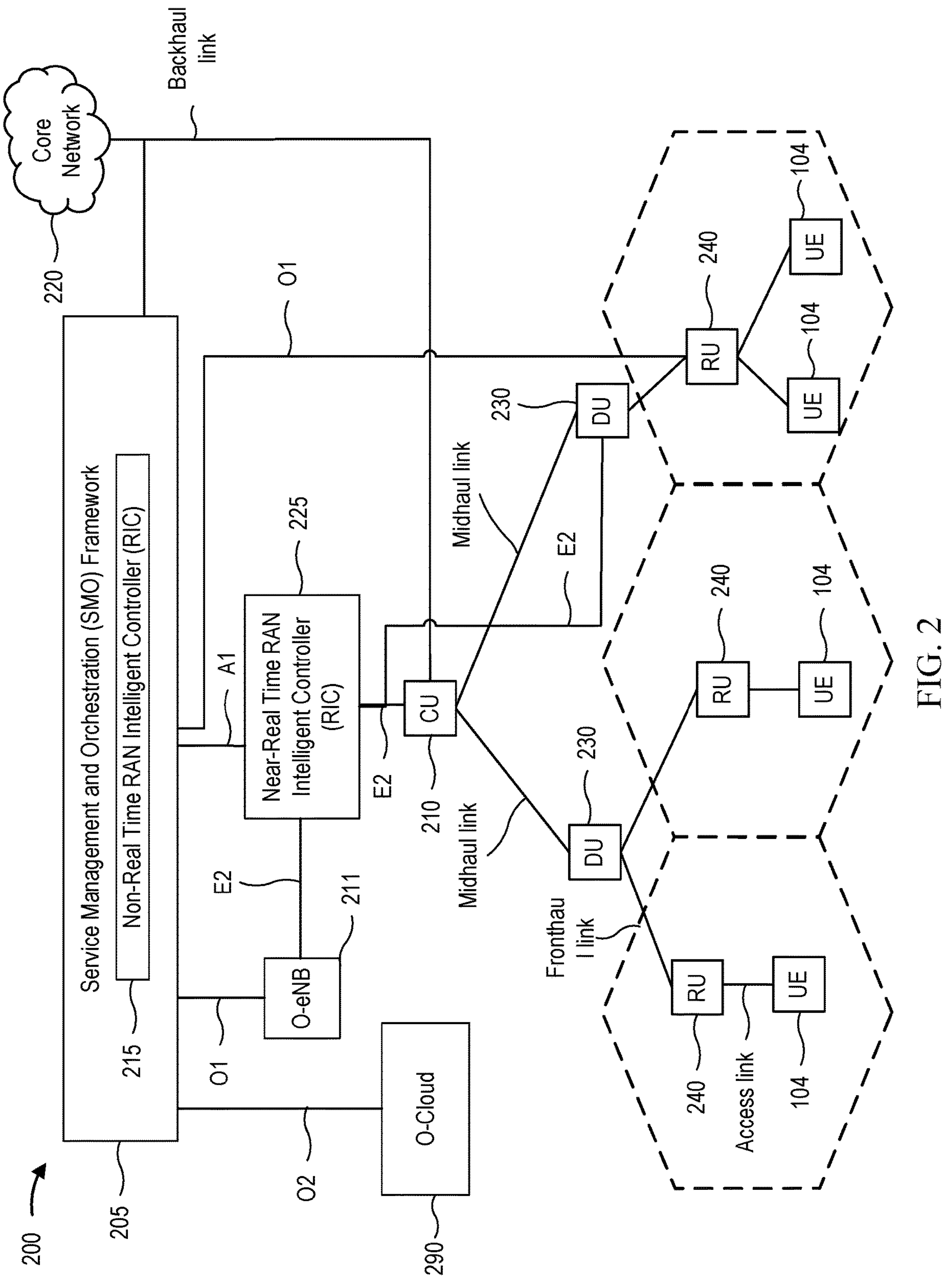
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
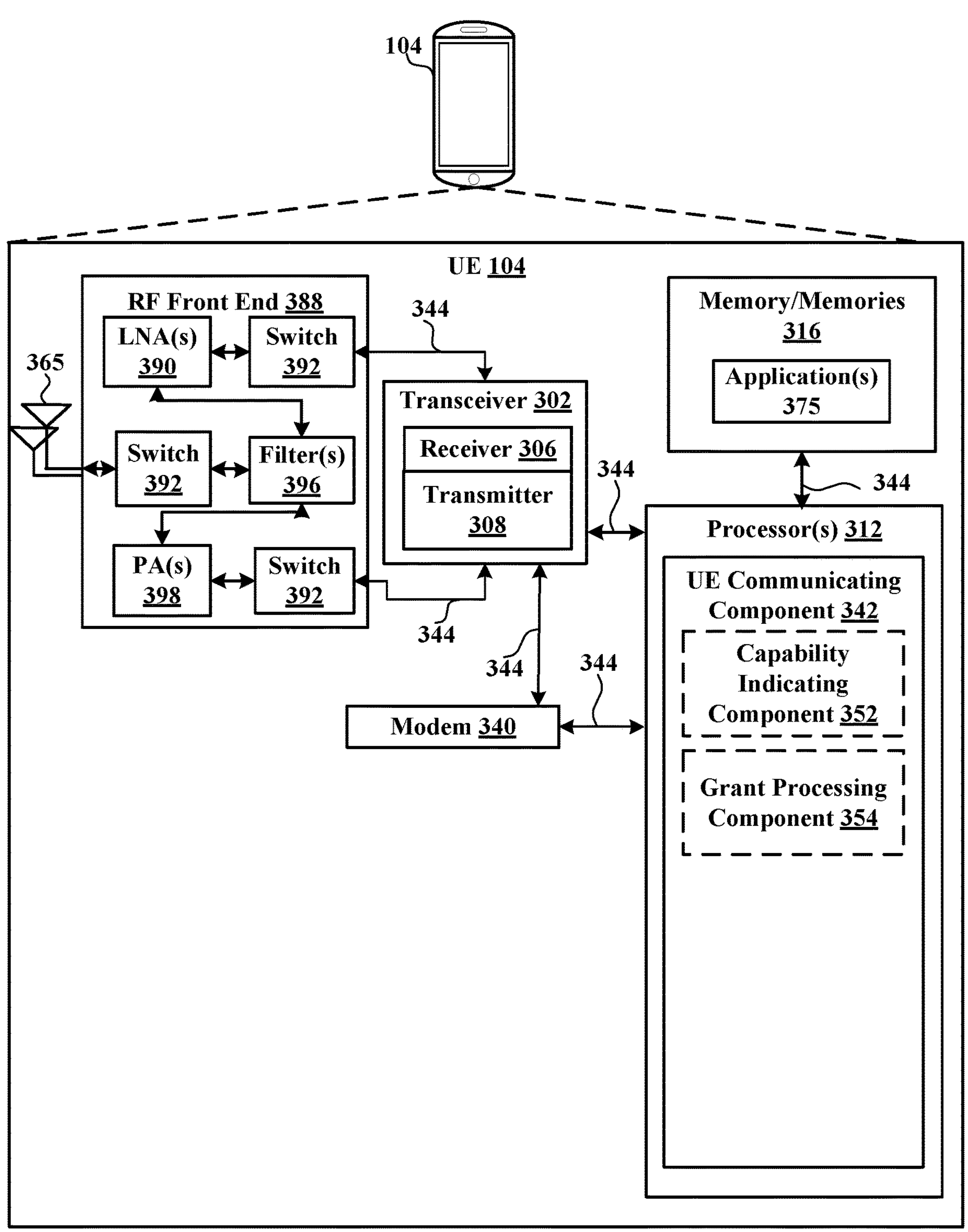
FIG. 3 is a block diagram illustrating an example of a user equipment (UE), in accordance with various aspects of the present disclosure.
Figure 4:
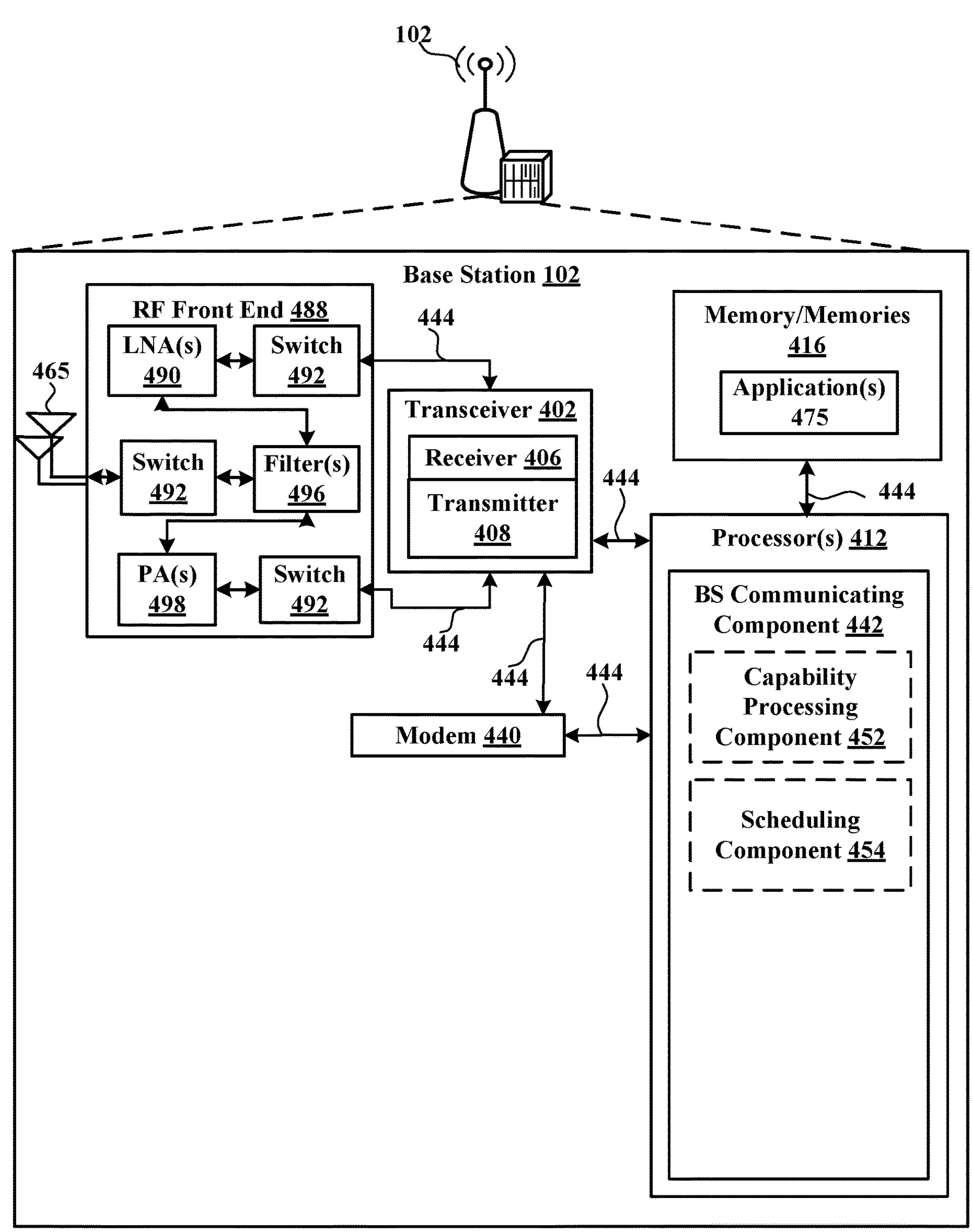
FIG. 4 is a block diagram illustrating an example of a base station, in accordance with various aspects of the present disclosure.
Figure 5:
FIG. 5 is a flow chart illustrating an example of a method for transmitting UE capability information that separately indicates support of coherence types for different reference signal (RS) types, in accordance with aspects described herein.
Figure 5:
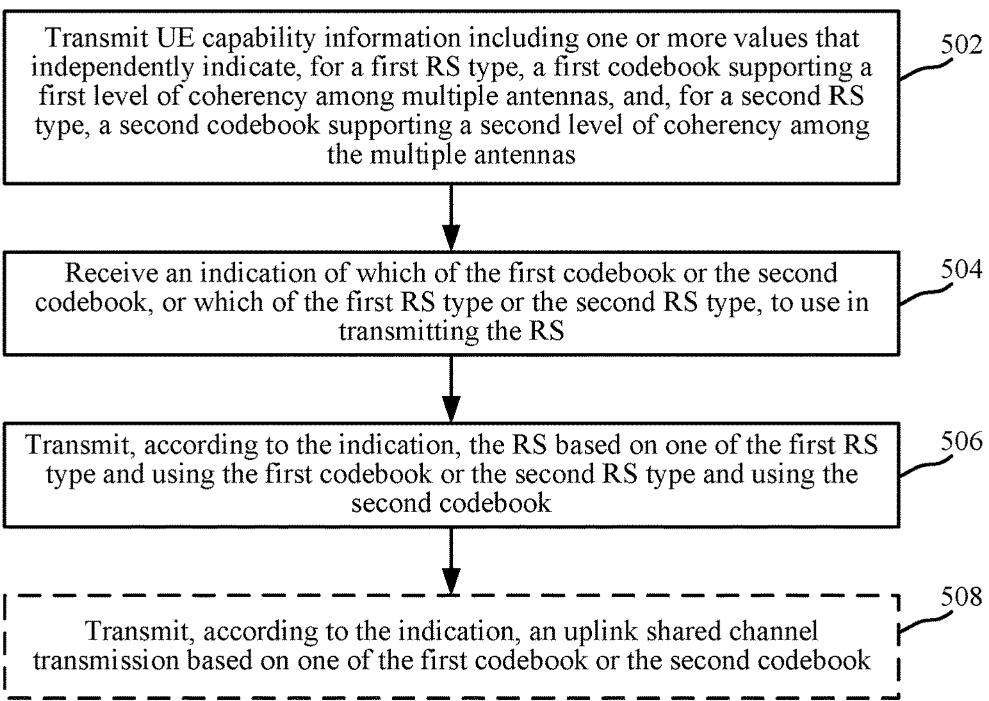
Figure 6:
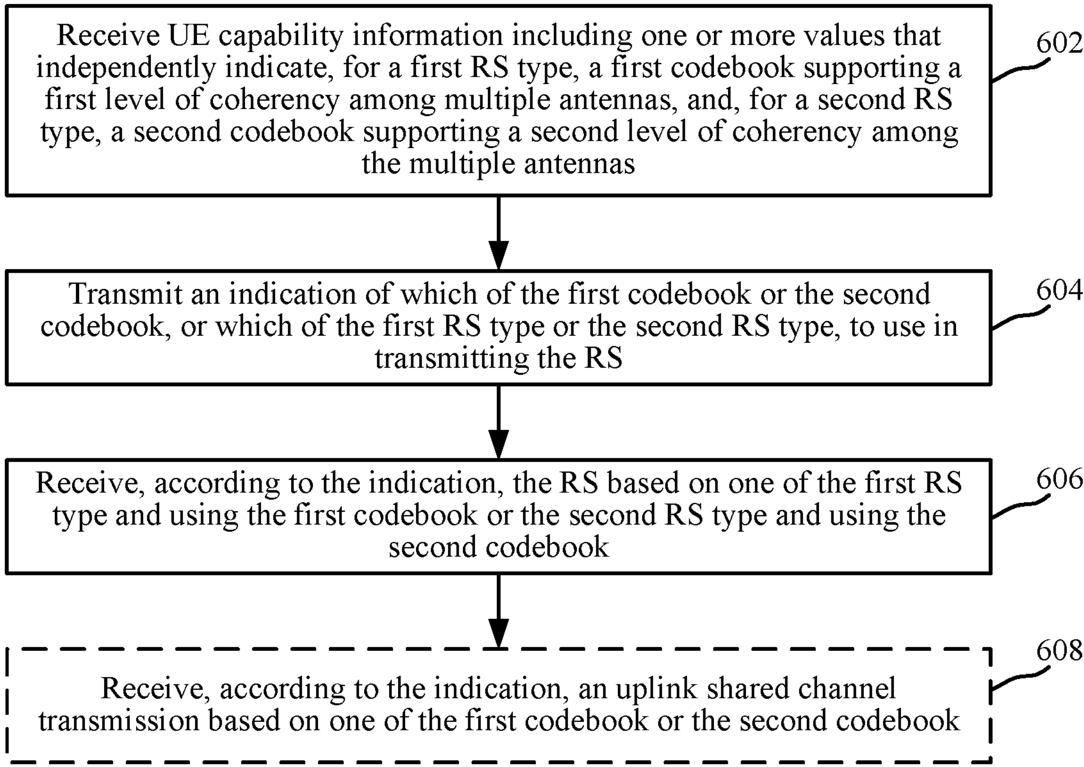
FIG. 6 is a flow chart illustrating an example of a method for scheduling a device based on UE capability information that separately indicates support of coherence types for different RS types, in accordance with aspects described herein.

Turning now to FIGS. 3-7, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for jointly indicating capability for coherence type and RS type for uplink transmissions, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a capability indicating component 352 for jointly indicating capability for coherence type and RS type for uplink transmissions, and/or a grant processing component 354 for receiving and/or processing an uplink grant received from a network node based on the indicated capability, in accordance with aspects described herein.

In an aspect, the processor(s) 312 may correspond to one or more of the processors described in connection with the UE in FIG. 7. Similarly, the memory/memories 316 may correspond to the one or more memories described in connection with the UE in FIG. 7.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and/or BS communicating component 442 for scheduling UE transmissions based on a jointly-indicated capability for coherence type and RS type for uplink transmissions, in accordance with aspects described herein.

The transceiver 402, receiver 406, transmitter 408, one or more processors 412, memory/memories 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a capability processing component 452 for receiving and/or processing a jointly-indicated capability for coherence type and RS type for uplink transmissions, and/or a scheduling component 454 for generating an uplink grant for a UE based on the jointly-indicated capability, in accordance with aspects described herein.

In an aspect, the processor(s) 412 may correspond to one or more of the processors described in connection with the base station in FIG. 7. Similarly, the memory/memories 416 may correspond to the one or more memories described in connection with the base station in FIG. 7.

FIG. 5 illustrates a flow chart of an example of a method 500 for transmitting UE capability information that separately indicates support of coherence types for different RS types, in accordance with aspects described herein. FIG. 6 illustrates a flow chart of an example of a method 600 for scheduling a device based on UE capability information that separately indicates support of coherence types for different RS types, in accordance with aspects described herein. In an example, a UE 104 can perform the functions described in method 500 shown in FIG. 5 using one or more of the components described in FIGS. 1 and/or 3. In an example, a node scheduling the UE 104 with communication resources, such as a base station 102 or gNB 180, a monolithic base station or gNB, a portion of a disaggregated base station or gNB, a UE in sidelink communication, etc., can perform the functions described in method 600 shown in FIG. 6 using one or more of the components described in FIGS. 1 and/or 4. Methods 500 and 600 are described in conjunction with one another for case of explanation; however, the methods 500 and 600 are not required to be performed together and indeed can be performed independently using separate devices.

In method 500, at Block 502, UE capability information including one or more values that independently indicate, for a first RS type, a first codebook supporting a first level of coherency among multiple antennas, and, for a second RS type, a second codebook supporting a second level of coherency among the multiple antennas can be transmitted. In an aspect, capability indicating component 352, e.g., in conjunction with processor(s) 312, memory/memories 316, transceiver 302, UE communicating component 342, etc., can transmit (e.g., to a network node) the UE capability information including the one or more values that independently indicate, for the first RS type, the first codebook (or codebook type) supporting the first level of coherency among multiple antennas, and, for the second RS type, the second codebook (or codebook type) supporting the second level of coherency among the multiple antennas. For example, capability indicating component 352 can transmit the UE capability information in capability signaling to the network node, such as in radio resource control (RRC) signaling transmitted from the UE 104 to the network node.

For example, the UE capability information may include a joint indication or signaling of coherence type for a specific RS type (e.g., a first coherence type for a first RS type and/or a second coherence type for a second RS type). As described, for example, the coherence type can be indicated via codebook indication (e.g., codebook1, codebook2, codebook3, or codebook4 in 5G NR). In 5G NR, for example, the UE capability information may indicate a first codebook (e.g., codebook1 indicating support for coherent eight Tx PUSCH) for "noTDMed SRS" and a second codebook (e.g., codebook4 indicating support for noncoherent eight Tx PUSCH) for "TDMed SRS" (or for "noTDMed and TDMed SRS"). As described, the supported coherency may be based on an internal configuration of antennas, power amplifiers, and/or other hardware at the UE, an ability to ensure joint calibration between the hardware, etc. In an example, a manufacturer of the UE, or certain hardware or chipsets of the UE, may hardcode or configure the capability in the UE for indicating to a network node (e.g., in the UE capability information or signaling) when establishing communications with the network node.

In an example, the UE capability information can signal a single parameter value to jointly indicate one of various combinations of supported level of coherence (or supported codebook type associated with the level of coherence) per RS type. For example, the UE capability information can signal joint signaling value 0 to indicate the UE supports coherent 8 Tx PUSCH (codebook1) with noTDMed SRS and also TDMed SRS, joint signaling value 1 to indicate the UE supports coherent 8 Tx PUSCH (codebook1) with noTDMed SRS, but only supports partial coherent 8 Tx PUSCH (codebook2) with TDMed SRS, joint signaling value 2 to indicate the UE supports coherent 8 Tx PUSCH (codebook1) with noTDMed SRS, but only supports partial coherent 8 Tx PUSCH (codebook3) with TDMed SRS, joint signaling value 3 to indicate the UE supports coherent 8 Tx PUSCH (codebook1) with noTDMed SRS, but only supports noncoherent 8 Tx PUSCH (codebook4) with TDMed SRS, joint signaling value 4 to indicate the UE supports partial coherent 8 Tx PUSCH (codebook2) with noTDMed SRS and also TDMed SRS, joint signaling value 5 to indicate the UE supports coherent 8 Tx PUSCH (codebook2) with noTDMed SRS, but only supports partial coherent 8 Tx PUSCH (codebook3) with TDMed SRS, joint signaling value 6 to indicate the UE supports coherent 8 Tx PUSCH (codebook2) with noTDMed SRS, but only supports noncoherent 8 Tx PUSCH (codebook4) with TDMed SRS, joint signaling value 7 to indicate the UE supports partial coherent 8 Tx PUSCH (codebook3) with noTDMed SRS and also TDMed SRS, joint signaling value 8 to indicate the UE supports coherent 8 Tx PUSCH (codebook3) with noTDMed SRS, but only supports noncoherent 8 Tx PUSCH (codebook4) with TDMed SRS, and/or joint signaling value 9 to indicate the UE supports noncoherent 8 Tx PUSCH (codebook4) with noTDMed SRS and also TDMed SRS.

In method 600, at Block 602, UE capability information including one or more values that independently indicate, for a first RS type, a first codebook supporting a first level of coherency among multiple antennas, and, for a second RS type, a second codebook supporting a second level of coherency among the multiple antennas can be received. In an aspect, capability processing component 452, e.g., in conjunction with processor(s) 412, memory/memories 416, transceiver 402, BS communicating component 442, etc., can receive (e.g., from the UE 104) the UE capability information including the one or more values that independently indicate, for the first RS type, the first codebook (or codebook type) supporting the first level of coherency among multiple antennas, and, for the second RS type, the second codebook (or codebook type) supporting the second level of coherency among the multiple antennas. For example, capability processing component 452 can receive the UE capability information in capability signaling from the UE in RRC signaling transmitted from the UE 104 to the network node. Capability processing component 452 can process the UE capability information to determine the coherence and RS type combination(s) supported by the UE 104.

In method 600, at Block 604, an indication of which of the first codebook or the second codebook, or which of the first RS type or the second RS type, to use in transmitting the RS can be transmitted. In an aspect, scheduling component 454, e.g., in conjunction with processor(s) 412, memory/memories 416, transceiver 402, BS communicating component 442, etc., can transmit (e.g., to the UE 104) the indication of which of the first codebook or the second codebook, or which of the first RS type or the second RS type, to use in transmitting the RS. For example, scheduling component 454 can transmit the indication as a precoder (e.g., MIMO precoder) indicated in an uplink grant that schedules resources for the UE 104 to use in transmitting uplink communications (e.g., a PUSCH). In an example, scheduling component 454 can select an RS type (e.g., TDMed SRS or noTDMed SRS) to indicate in the uplink grant, and can accordingly specify a phase coherence between antenna ports at the UE 104 that is compatible with the coherency type (e.g., codebook) indicated in the UE capability information as supported for the RS type (or can select a less coherent coherency type). For example, where the UE capability information indicates codebook2 for the selected RS type, scheduling component 454 can schedule an uplink grant and indicate a phase coherency for a first group of four antenna ports or for a second group of four antenna ports (but not between the first and second groups of antenna ports).

In method 500, at Block 504, an indication of which of the first codebook or the second codebook, or which of the first RS type or the second RS type, to use in transmitting the RS can be received. In an aspect, grant processing component 354, e.g., in conjunction with processor(s) 312, memory/memories 316, transceiver 302, UE communicating component 342, etc., can receive (e.g., from the network node) the indication of which of the first codebook or the second codebook, or which of the first RS type or the second RS type, to use in transmitting the RS. For example, the uplink grant received from the network node can transmit the indication as a precoder to use or a corresponding phase difference between coherent antenna ports to use in transmitting the RS, and whether to transmit the RS as TDMed or noTDMed.

In method 500, at Block 506, the RS can be transmitted, according to the indication, based on one of the first RS type and using the first codebook or the second RS type and using the second codebook. In an aspect, UE communicating component 342, e.g., in conjunction with processor(s) 312, memory/memories 316, transceiver 302, etc., can transmit, according to the indication, the RS based on one of the first RS type and using the first codebook or the second RS type and using the second codebook. For example, where the first RS type is specified for the uplink grant (e.g., TDMed SRS), UE communicating component 342 can transmit the RS using the first codebook (e.g., using a precoder or coherency associated with the first codebook), or where the second RS type is specified for the uplink grant (e.g., noTDMed SRS), UE communicating component 342 can transmit the RS using the second codebook (e.g., using precoder or coherency associated with the second codebook). This may also be based on a phase difference indicated in the uplink grant that complies with the indicated codebook for the RS type.

In method 500, at Block 606, the RS can be received, according to the indication, based on one of the first RS type and using the first codebook or the second RS type and using the second codebook. In an aspect, BS communicating component 442, e.g., in conjunction with processor(s) 412, memory/memories 416, transceiver 402, etc., can receive, according to the indication, the RS based on one of the first RS type and using the first codebook or the second RS type and using the second codebook. For example, where the first RS type is specified for the uplink grant (e.g., TDMed SRS), BS communicating component 442 can receive the RS using the first codebook (e.g., using a precoder or coherency associated with the first codebook), or where the second RS type is specified for the uplink grant (e.g., noTDMed SRS), BS communicating component 442 can receive the RS using the second codebook (e.g., using precoder or coherency associated with the second codebook).

Additionally, an uplink shared channel (PUSCH) can be communicated based on the first codebook or second codebook (or associated determined precoders). In method 500, optionally at Block 508, an uplink shared channel transmission can be transmitted, according to the indication, based on one of the first codebook or the second codebook. In an aspect, UE communicating component 342, e.g., in conjunction with processor(s) 312, memory/memories 316, transceiver 302, etc., can transmit, according to the indication, the uplink shared channel transmission based on one of the first codebook or the second codebook. For example, UE communicating component 342 can transmit the uplink shared channel transmission (e.g., PUSCH) based on the same codebook (e.g., using the same precoder) as the RS transmission (e.g., at Block 506).

In method 600, optionally at Block 608, an uplink shared channel transmission can be received, according to the indication, based on one of the first codebook or the second codebook. In an aspect, BS communicating component 442, e.g., in conjunction with processor(s) 412, memory/memories 416, transceiver 402, etc., can receive, according to the indication, the uplink shared channel transmission based on one of the first codebook or the second codebook. For example, BS communicating component 442 can receive the uplink shared channel transmission (e.g., PUSCH) based on the same codebook (e.g., using the same precoder) as the RS transmission (e.g., at Block 606).

Figure 7:
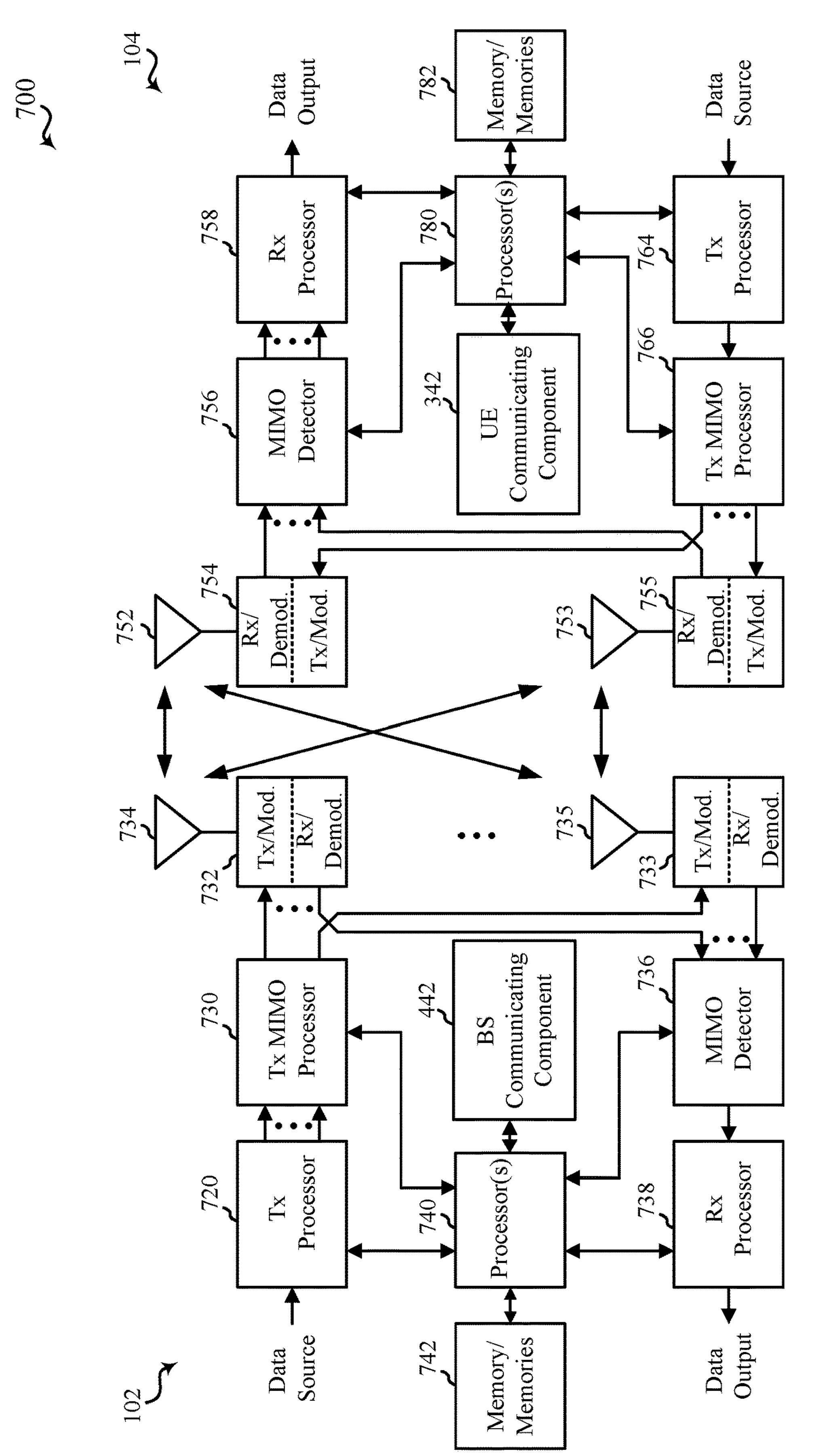
FIG. 7 is a block diagram illustrating an example of a multiple-input multiple-output (MIMO) communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 3. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor(s) 780, or memory/memories 782.

The processor(s) 780 may in some cases execute stored instructions to instantiate a UE communicating component 342 (see e.g., FIGS. 1 and 3).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for single carrier-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor(s) 740 or memory/memories 742.

The processor(s) 740 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication at a UE including transmitting, for a network node, UE capability information including one or more values that independently indicate, for a first RS type, a first codebook supporting a first level of coherency among multiple antennas, and, for a second RS type, a second codebook supporting a second level of coherency among the multiple antennas, receiving, from the network node, an indication of which of the first codebook or the second codebook, or which of the first RS type or the second RS type, to use in transmitting RS to the network node, and transmitting, for the network node and according to the indication, the RS based on one of the first RS type and using the first codebook or the second RS type and using the second codebook.

In Aspect 2, the method of Aspect 1 includes where the first RS type includes a TDM SRS and the second RS type includes a non-TDM SRS.

In Aspect 3, the method of Aspect 2 includes where the second level of coherency is associated with coherency among more of the multiple antennas than the first level of coherency.

In Aspect 4, the method of any of Aspects 2 or 3 includes where the UE capability information indicates the first codebook for a combination of the TDM SRS and the non-TDM SRS.

In Aspect 5, the method of any of Aspects 1 to 4 includes where the one or more values includes a single value that jointly indicates both of the first codebook for the first RS type and the second codebook for the second RS type.

In Aspect 6, the method of any of Aspects 1 to 5 includes where the first codebook is different from the second codebook.

In Aspect 7, the method of any of Aspects 1 to 6 includes where the indication is received from the network node in RRC signaling.

In Aspect 8, the method of any of Aspects 1 to 7 includes transmitting, for the network node and according to the indication, an uplink shared channel transmission based on one of the first codebook or the second codebook.

Aspect 9 is a method for wireless communication at a network node including receiving, for a UE, UE capability information including one or more values that independently indicate, for a first RS type, a first codebook supporting a first level of coherency among multiple antennas, and, for a second RS type, a second codebook supporting a second level of coherency among the multiple antennas, transmitting, for the UE, an indication of which of the first codebook or the second codebook, or which of the first RS type or the second RS type, to use in transmitting RS to the network node, and receiving, for the UE and according to the indication, the RS based on one of the first RS type and using the first codebook or the second RS type and using the second codebook.

In Aspect 10, the method of Aspect 9 includes where the first RS type includes a TDM SRS and the second RS type includes a non-TDM SRS.

In Aspect 11, the method of Aspect 10 includes where the second level of coherency is associated with coherency among more of the multiple antennas than the first level of coherency.

In Aspect 12, the method of any of Aspects 10 or 11 includes where the UE capability information indicates the first codebook for a combination of the TDM SRS and the non-TDM SRS.

In Aspect 13, the method of any of Aspects 9 to 12 includes where the one or more values includes a single value that jointly indicates both of the first codebook for the first RS type and the second codebook for the second RS type.

In Aspect 14, the method of any of Aspects 9 to 13 includes where the first codebook is different from the second codebook.

In Aspect 15, the method of any of Aspects 9 to 14 includes where the indication is transmitted to the UE in RRC signaling.

In Aspect 16, the method of any of Aspects 9 to 15 includes receiving, for the UE and according to the indication, an uplink shared channel transmission based on one of the first codebook or the second codebook.

Aspect 17 is an apparatus for wireless communication including one or more processors, one or more memories coupled with the one or more processors, and instructions stored in the one or more memories and operable, when executed by the one or more processors, to cause the apparatus to perform any of the methods of Aspects 1 to 16.

Aspect 18 is an apparatus for wireless communication including means for performing any of the methods of Aspects 1 to 16.

Aspect 19 is one or more computer-readable media including code executable by one or more processors for wireless communications, the code including code for performing any of the methods of Aspects 1 to 16.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
transmit, for a network node, capability information including one or more values that independently indicate, for a first reference signal (RS) type, a first codebook supporting a first level of coherency among multiple antennas, and, for a second RS type, a second codebook supporting a second level of coherency among the multiple antennas;
receive, from the network node, an indication of which of the first codebook or the second codebook, or which of the first RS type or the second RS type, to use in transmitting RS to the network node; and
transmit, for the network node and according to the indication, the RS based on one of the first RS type and using the first codebook or the second RS type and using the second codebook.

2. The apparatus of claim 1, wherein the first RS type includes a time division multiplexed (TDM) sounding reference signal (SRS) and the second RS type includes a non-TDM SRS.

3. The apparatus of claim 2, wherein the second level of coherency is associated with coherency among more of the multiple antennas than the first level of coherency.

4. The apparatus of claim 2, wherein the capability information indicates the first codebook for a combination of the TDM SRS and the non-TDM SRS.

5. The apparatus of claim 1, wherein the one or more values includes a single value that jointly indicates both of the first codebook for the first RS type and the second codebook for the second RS type.

6. The apparatus of claim 1, wherein the first codebook is different from the second codebook.

7. The apparatus of claim 1, wherein the indication is received from the network node in radio resource control (RRC) signaling.

8. The apparatus of claim 1, wherein the one or more processors are, individually or in combination, configured to execute the instructions to cause the apparatus to transmit, for the network node and according to the indication, an uplink shared channel transmission based on one of the first codebook or the second codebook.

9. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
receive, for a user equipment (UE), UE capability information including one or more values that independently indicate, for a first reference signal (RS) type, a first codebook supporting a first level of coherency among multiple antennas, and, for a second RS type, a second codebook supporting a second level of coherency among the multiple antennas;
transmit, for the UE, an indication of which of the first codebook or the second codebook, or which of the first RS type or the second RS type, to use in transmitting RS to the apparatus; and
receive, for the UE and according to the indication, the RS based on one of the first RS type and using the first codebook or the second RS type and using the second codebook.

10. The apparatus of claim 9, wherein the first RS type includes a time division multiplexed (TDM) sounding reference signal (SRS) and the second RS type includes a non-TDM SRS.

11. The apparatus of claim 10, wherein the second level of coherency is associated with coherency among more of the multiple antennas than the first level of coherency.

12. The apparatus of claim 10, wherein the UE capability information indicates the first codebook for a combination of the TDM SRS and the non-TDM SRS.

13. The apparatus of claim 9, wherein the one or more values includes a single value that jointly indicates both of the first codebook for the first RS type and the second codebook for the second RS type.

14. The apparatus of claim 9, wherein the first codebook is different from the second codebook.

15. The apparatus of claim 9, wherein the indication is transmitted to the UE in radio resource control (RRC) signaling.

16. The apparatus of claim 9, wherein the one or more processors are, individually or in combination, configured to execute the instructions to cause the apparatus to receive, for the UE and according to the indication, an uplink shared channel transmission based on one of the first codebook or the second codebook.

17. A method for wireless communication at a user equipment (UE), comprising:
transmitting, for a network node, UE capability information including one or more values that independently indicate, for a first reference signal (RS) type, a first codebook supporting a first level of coherency among multiple antennas, and, for a second RS type, a second codebook supporting a second level of coherency among the multiple antennas;
receiving, from the network node, an indication of which of the first codebook or the second codebook, or which of the first RS type or the second RS type, to use in transmitting RS to the network node; and
transmitting, for the network node and according to the indication, the RS based on one of the first RS type and using the first codebook or the second RS type and using the second codebook.

18. The method of claim 17, wherein the first RS type includes a time division multiplexed (TDM) sounding reference signal (SRS) and the second RS type includes a non-TDM SRS.

19. The method of claim 18, wherein the second level of coherency is associated with coherency among more of the multiple antennas than the first level of coherency.

20. The method of claim 18, wherein the UE capability information indicates the first codebook for a combination of the TDM SRS and the non-TDM SRS.

21. The method of claim 17, wherein the one or more values includes a single value that jointly indicates both of the first codebook for the first RS type and the second codebook for the second RS type.

22. The method of claim 17, wherein the first codebook is different from the second codebook.

23. The method of claim 17, wherein the indication is received from the network node in radio resource control (RRC) signaling.

24. The method of claim 17, further comprising transmitting, to the network node and according to the indication, an uplink shared channel transmission based on one of the first codebook or the second codebook.

25. A method for wireless communication at a network node, comprising:

receiving, for a user equipment (UE), UE capability information including one or more values that independently indicate, for a first reference signal (RS) type, a first codebook supporting a first level of coherency among multiple antennas, and, for a second RS type, a second codebook supporting a second level of coherency among the multiple antennas;

transmitting, for the UE, an indication of which of the first codebook or the second codebook, or which of the first RS type or the second RS type, to use in transmitting RS to the network node; and receiving, for the UE and according to the indication, the RS based on one of the first RS type and using the first codebook or the second RS type and using the second codebook.

26. The method of claim 25, wherein the first RS type includes a time division multiplexed (TDM) sounding reference signal (SRS) and the second RS type includes a non-TDM SRS.

27. The method of claim 26, wherein the second level of coherency is associated with coherency among more of the multiple antennas than the first level of coherency.

28. The method of claim 26, wherein the UE capability information indicates the first codebook for a combination of the TDM SRS and the non-TDM SRS.

29. The method of claim 25, wherein the one or more values includes a single value that jointly indicates both of the first codebook for the first RS type and the second codebook for the second RS type.

30. The method of claim 25, wherein the first codebook is different from the second codebook.

* * * * *